United States Patent [19]
Wright

[11] 3,871,670
[45] Mar. 18, 1975

[54] CHUCK APPARATUS FOR CLAMPING VARIED SIZED WORKPIECES TO BE MACHINED

[75] Inventor: Dale W. Wright, Saginaw, Mich.

[73] Assignee: Miles Machinery Company, Saginaw, Mich.

[22] Filed: Aug. 24, 1973

[21] Appl. No.: 391,286

[52] U.S. Cl.................. 279/2 R, 279/4, 279/123
[51] Int. Cl............................................. B23b 31/40
[58] Field of Search ....... 279/2 R, 2 A, 60, 65, 123; 242/72; 269/48.1; 82/44

[56] References Cited
UNITED STATES PATENTS

| | | | |
|---|---|---|---|
| 2,852,262 | 9/1958 | Parker et al. | 279/2 X |
| 2,950,117 | 8/1960 | Walmsley | 279/123 |
| 3,248,122 | 4/1966 | Roddy | 279/60 X |
| 3,512,794 | 5/1970 | Lohman | 279/123 |
| 3,633,929 | 1/1972 | Morawski | 279/2 X |

Primary Examiner—Gil Weidenfeld
Attorney, Agent, or Firm—Learman & McCulloch

[57] ABSTRACT

Chuck apparatus including a plurality of angularly spaced chuck jaws which are mounted for concurrent radial and axial movement between radially outer and inner positions to rigidly clamp a workpiece with a clamping force which has an axial force component substantially greater than the radial force component thereof. The jaws clamp the workpiece to a variable height support structure comprising tiers of stacked pairs of spaced apart rest bars, the rest bars in each tier except the bottom being arranged crosswisely to the rest bars on which they are received and supported.

6 Claims, 3 Drawing Figures

3,871,670

CHUCK APPARATUS FOR CLAMPING VARIED SIZED WORKPIECES TO BE MACHINED

BACKGROUND OF THE INVENTION

This invention relates to workpiece holding apparatus, and more particularly to chuck apparatus for chucking a valve body having a cored opening in opposite ends thereof and an intermediate bonnet opening in the side thereof.

In the machining of valve body castings of the type disclosed herein, having cored openings in opposite ends, one or more valve seats, interior guide ribs, and a bonnet opening in the side thereof, the castings must be rapidly and accurately chucked so that machining of the workpieces can be efficiently accomplished. Because the external machining forces are substantial, substantial clamping forces are required to rigidly, stationarily hold the workpiece. Prior art systems such as that disclosed in applicant's copending patent application Ser. No. 153,205, now U.S. Pat. No. 3,732,025 employ a clamping system which engages the exterior of a valve body for clamping it in position. However, such external systems are not as desirable for clamping many workpieces to perform the desired machining operations.

Apparatus constructed according to the present invention clamps the interior portion of the valve body in a manner to permit various machining operations to proceed. It is important that the valve body be held stationary in substantially all planes so that it will not move during machining. Accordingly, it is an object of the present invention to provide chuck apparatus including angularly spaced chuck jaws which are movable in converging planes to clamp the workpiece to a base member with a clamping force which has an axial force component greatly exceeding the radial force component.

Another object of the present invention is to provide a chucking apparatus including chuck jaws having threaded jaw grooves which function to automatically center the workpiece as they move to chucking positions.

Still another object of the present invention is to provide chuck apparatus of the type described which will bite into interior guide ribs on the workpiece as well as exert clamping force on rest and clamp rails arranged at any proper height to hold the workpiece in proper position.

Yet another object of the present invention is to provide a chuck capable of clamping workpieces of varying size, such as gate valves of different interior dimension, so that a single chuck assembly may be utilized to chuck a family of gate valves of different dimension and design, for example.

A further object of the present invention is to provide workpiece holding apparatus having replaceable hardened chuck jaws of differing size which are selected for use depending on the size of the valve to be clamped.

A still further object of the present invention is to provide chuck apparatus of the type described including stacked tiers of rest and clamp rails which are utilized in a variable number of tiers dependent on the size and design of the valve being clamped.

Still another object of the present invention is to provide apparatus of the type described including pyramidally arranged rest rails having axially projecting, hardened rest pads for supporting the valve bonnet of a valve body to be machined.

Still another object of the present invention is to provide a chuck having what may be termed "six direction" clamping in the sense that concurrent clamping is effected in the $x$, $y$, and $z$ plane directions to rigidly hold the workpiece in position in spite of the very considerable machining forces which are brought to bear upon the workpiece.

A still further object of the present invention is to provide a chuck of the character described wherein the chuck jaws, when moved to clamping position, are in compression and, as a result, extreme clamping stability to a rigid body in compression is achieved to permit unusual machining accuracy without "chatter".

Yet another object of the present invention is to provide a chuck which may be top loaded in a manner in which the chuck serves as a pilot during loading so that misloading is rendered impossible and the valve being machined is always received in proper position, and cannot be clamped in a "cocked" position.

Another object of the present invention is to provide chuck apparatus with workpiece orienting clamping jaws having workpiece penetrating portions which grip internal guide rib parts of a workpiece and are moved in such angularly disposed paths that the axial gripping force between jaws and rest and clamp rails is substantially greater than the radial gripping force exerted on the workpiece by the clamping jaws so as not to cause undesirable part deflection.

Another object of the present invention is to provide a power operated, extremely reliable and efficient chuck which can be relatively economically manufactured and assembled, and which is virtually trouble-free in the sense that it will not malfunction and cannot be misoperated by the machine operator.

Other objects and advantages of the present invention will become apparent to those of ordinary skill in the art as the description thereof proceeds.

SUMMARY OF THE INVENTION

Chuck apparatus capable of clamping various valve bodies, including clamping jaws having workpiece penetrating portions which grip internal, guide rib parts of a workpiece and are moved in such angularly disposed paths that the axial gripping force is substantially greater than the radial gripping force exerted on the workpiece by the clamping jaws. The jaws cooperate with tiers of stacked pairs of rest bars which support the valve bodies in proper vertical position at the predetermined height and cooperate with the jaws to provide clamping rigidity.

The present invention may more readily be understood by reference to the accompanying drawings, in which.

Figure 3:
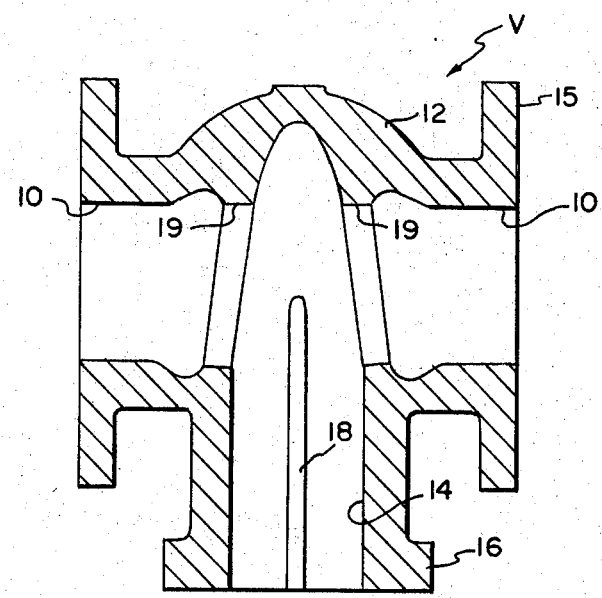
FIG. 3 is a sectional view of the typical valve body workpiece only, taken along the line 3—3 of FIG. 2.

Apparatus constructed according to the present invention is particularly adapted for machining a workpiece such as a valve casting, generally designated V (FIG. 3), which includes axially extending, axially aligned, cored passages or openings 10 in opposite ends of a cast body 12, and a bonnet opening 14 in the side thereof. Integral core flanges 15 are provided on opposite ends of the casting V and the bonnet opening 14 is in communication with the cored openings 10. A bonnet flange 16 is integrally cast on the valve body 12 for mounting a valve bonnet (not shown) having a valve stem (not shown) and an internal valve plate (not shown) as usual. A pair of interior, confronting valve plate guide ribs 18, which the chuck uses to center the valve V when it is being chucked prior to machining, are integrally cast with the valve body 12 and project into the bonnet opening 14. The communicating cored openings 10 are adapted to be interiorly threaded at 19 to receive flanged, valve seat rings.

Apparatus constructed according to the present invention includes a frame or chuck base generally designated F (FIG. 1), mounting an upstanding, truncated, pyramidally shaped body member 22 having a pair of oppositely disposed, upwardly converging, dovetail shaped grooves or ways 24. Upwardly converging, jaw mounting slides 30 are supported by the body member 22 and include dovetail guide portions 32 slidably received by the dovetail grooves 24. The included angle $b$ between the jaw mounting bars 30 and the vertical axis $a$ of the body member 22 is less than 45°, preferably in the range 15° – 20°. At its lower end, the body member 22 includes an internal cavity or "hollowed out" portion 26 for receiving radially inwardly projecting arm portions 28 which are integral with the upwardly converging, jaw mounting slides 30.

The jaw mounting slides 30 include notches 30a receiving portions 34 of clamping jaws 36 which are removably coupled to the slides 30 via bolts 38. The jaws 36 include vertical, threaded jaw grooves 40 which receive the guide ribs 18 to center the workpiece when the workpiece is being positioned and the jaws are moving to chucking position, and penetrate or bite into the ribs 18 to tightly grip the workpiece when the jaws are moved downwardly in the tracks or grooves 24. Dependent on the particular workpiece, different size jaws 36' or 36" may be used.

Apparatus for moving the bars 30 and the jaws 36 comprise a frame supported, double acting, solenoid actuated, fluid pressure operated cylinder 42, having a piston rod 43, coupled to an enlarged, actuator head 46 having downwardly converging camming surfaces 48 which engage each of the inwardly projecting arms 28 to move the jaw mounting slides 30 and the jaws 36 downwardly and radially outwardly. The piston rod 43 includes an enlarged diameter, piston rod portion 44 providing a return shoulder 50 which engages the underside 28a of the projections 28 for returning the projections 28 and slides 30 upwardly, and the jaws 36 radially inwardly. A stationary annular shield 52 is provided and prevent chips and foreign matter from entering the chucking assembly.

Figure 1:
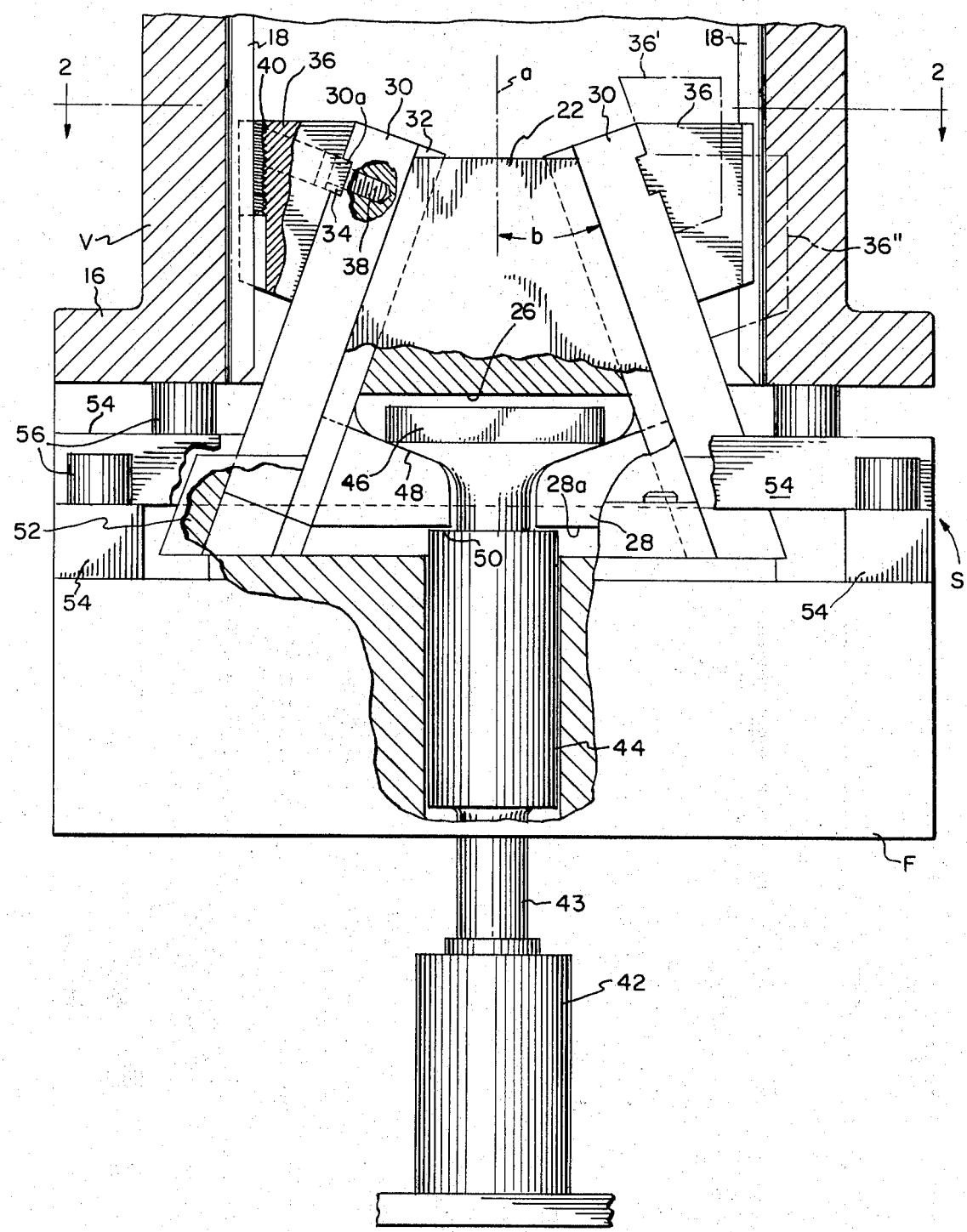
FIG. 1 is a partly sectional, side elevational view of chucking apparatus, constructed according to the present invention gripping a typical workpiece.
Figure 2:
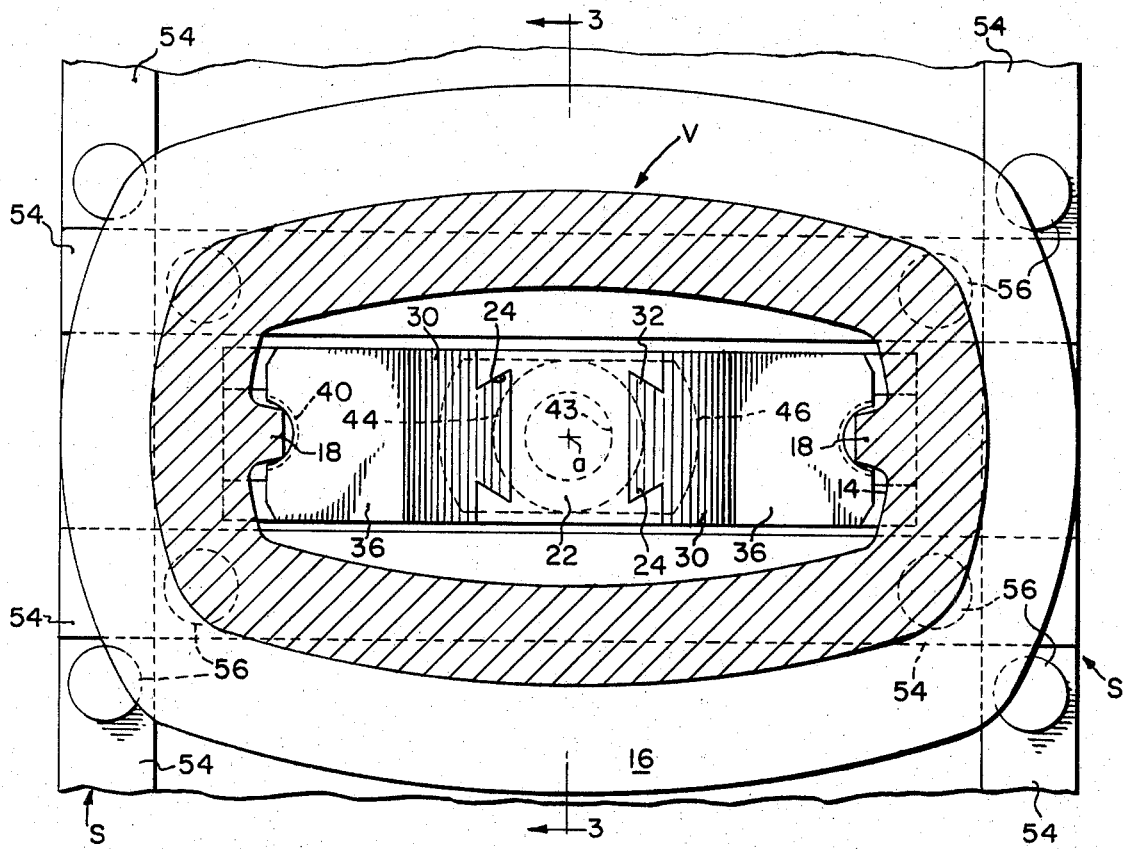
FIG. 2 is a sectional plan view taken along the line 2—2 of FIG. 1.

Apparatus for supporting the chucked valve body V includes a variable height stack, generally designated S, of pyramidally arranged, crosswisely disposed, tiers of spaced apart rest rails 54, each having a pair of vertically projecting rest buttons or pads 56 thereon comprised of material substantially harder than the material constituting the rest rails 54. The two rails of each tier (with the exception of the bottom tier) are disposed crosswisely and supported on the underlying tier of rails 54. As illustrated in the drawings, each rest rail 54 in each tier above the bottom pair of rails 54 is positioned radially closer to the axis $a$ of the body member 22 than are the underlying rails 54, and is mounted inwardly of the rest buttons or pads on the sub-adjacent rails 54. The bonnet flange 16 of the valve body 12 rests on the uppermost set of rest rail pads 56. Although only two tiers of rails 54 are illustrated in FIG. 1, it should be realized that additional tiers of rest rails 54 could be added to the stack if smaller diameter valve bodies are to be machined. To condition the machine for operation, a suitable number of rest rails 54 for the particular workpiece and jaws 36 are assembled together. Initially, the piston rod 43 is extended upwardly to move the chuck jaws 36 upwardly and radially inwardly to their fully raised, radially innermost positions. the valve body V is top loaded to the jaws 36 which initially serve as a pilot during loading and center the valve body V so that it will not be in a "cocked" position during the subsequent clamping. The guide rails or ribs 18 are received in the arcuate threaded openings 40 when the valve body V is being moved into position. The cylinder 42 is then operated to retract the camming head 46 which forces the wedge surfaces 48 downwardly into sliding engagement with the arm portions 28. This forces the jaw mounting slides 30 and the jaws 36 to move axially and radially relative to the camming head 46. As the jaws 36 move radially and axially, the threads 40 bite into the valve body guide ribs 18 to rigidly hold the valve body V. Since the included angle $b$ between the bars 30 and the axis $a$ is less than 45°, the vertically downwardly directed components of force exerted by the threads 40 on the ribs 18 is substantially greater than the radially directed components of force exerted thereon and a rigid workpiece clamping action is obtained with jaws and rails without workpiece distortion. The workpiece is radially oriented by the jaw threads 40 and is held in position by what may be termed a "six direction" clamping action, in the sense that clamping is effected in the $x$, $y$, and $z$ plane directions. Even though considerable machining forces are to bear on the valve body, the apparatus is effective to hold the valve body V in position.

If smaller diameter valve bodies V are to be machined, smaller chuck jaws 36' are substituted for the jaws illustrated and an additional tier or tiers of rest rails 54 are added to the stack in pyramid fashion. With minor adjustments therefore, a single chucking assembly can be utilized to chuck a whole family of variant size valve bodies V.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. A chuck assembly for clamping varied sized tubular valve bodies having a pair of axially extending, opposite, internal guides comprising:
    work support means incorporating an axially extending pyramidal chuck body, with front and rear ends, having a pair of forwardly diverging, opposed guide surfaces on the exterior thereof extending at an angle relative to the axis of the chuck body such that the included angle between each of the surfaces and the axis is less than 45°;

radially opposite slides mounted on said surfaces for linear sliding, rearward diverging and return movement axially and radially;

said slide mounting surfaces and slides having inter-engaging parts preventing all but said linear sliding movement;

laterally extending, jaw mounting surfaces on said slides near the front ends thereof;

a replaceable jaw having an axially extending side surface, fixed on each of said laterally extending surfaces to project radially from its slide a predetermined distance;

said jaws having axially extending, radially opposed gripping portions in their side surfaces for engaging and gripping said valve guides;

drawbar means engaging said slides near the rear thereof for moving the slides linearly to grip and release a valve body; and said work support means also incorporating a generally pyramidal rest and clamp member body of variable axial height to synchronize with the radial projection of the jaws, comprised of stacked rest members mounted one atop the other in interfitted relationship to receive said valve body, and against which said jaws clamp said valve body when said drawbar means moves said slides rearwardly.

2. A chuck assembly for clamping workpieces comprising varied sized tubular valve bodies including:

work support means including an axially extending chuck body, with front and rear ends;

jaw carrying members mounted on said body for advancing and return movement axially and radially;

jaw mounting surfaces on said members near the front ends thereof;

a replaceable jaw having an axially extending side surface, fixed on each of said surfaces to project radially a predetermined distance;

power operated means engaging said jaw mounting members for moving the members to grip and release a valve body; and said work support means incorporating a rest and clamp member body of variable axial height to synchronize with the radial projection of the jaws, comprised of stacked rest and clamp members mounted one atop the other in interfitted relationship to receive said valve body, and against which said jaws clamp said valve body when said power operated means moves said jaw mounting members in a direction to grip the valve body.

3. The apparatus as set forth in claim 1 wherein said rest member body comprises a plurality of successively oppositely crosswisely extending pairs of spaced apart axially stacked, generally parallel rest rails for receiving the valve body being clamped.

4. The apparatus as set forth in claim 3 wherein said rest rails include axially projecting rest pads near their ends on which said valve bodies are received comprised of material harder than the remaining portion of said rest rails.

5. The apparatus as set forth in claim 4 wherein said rest rails are pyramidally stacked with each pair of rails being positioned radially inward of the rest pads on the underlying pair of rails.

6. A chuck assembly for clamping workpieces comprising varied sized tubular valve bodies including:

work support means including an axially extending chuck body, with front and rear ends, having axially inclined guide surfaces extending at an angle relative to the axis of the chuck body;

jaw carrying members mounted on said surfaces for linear movement axially and radially;

jaw mounting surfaces on said members near the front ends thereof;

a replaceable jaw having an axially extending side surface, fixed on each of said surfaces to project radially a predetermined distance;

power operated means engaging said jaw mounting members for moving the members linearly to grip and release a valve body; and said work support means incorporating a rest and clamp member body of variable effective axial height to synchronize with the radial projection of the jaws, comprised of generally convergently arranged rest and clamp members, supported in different tiers axially, to receive said valve body, and against which said jaws clamp said valve body when said power operated means moves said jaw mounting members in a direction to grip the valve body.

* * * * *